US011791922B2

United States Patent
Nakagawa et al.

(10) Patent No.: US 11,791,922 B2
(45) Date of Patent: Oct. 17, 2023

(54) TRANSMISSION DEVICE, TIME TRANSMISSION SYSTEM, AND DELAY COMPENSATION METHOD

(71) Applicant: Nippon Telegraph and Telephone Corporation, Tokyo (JP)

(72) Inventors: Masahiro Nakagawa, Tokyo (JP); Kaoru Arai, Tokyo (JP); Hiroki Sakuma, Tokyo (JP); Shunichi Tsuboi, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 102 days.

(21) Appl. No.: 17/429,172

(22) PCT Filed: Feb. 6, 2020

(86) PCT No.: PCT/JP2020/004618
§ 371 (c)(1),
(2) Date: Aug. 6, 2021

(87) PCT Pub. No.: WO2020/166485
PCT Pub. Date: Aug. 20, 2020

(65) Prior Publication Data
US 2022/0103281 A1 Mar. 31, 2022

(30) Foreign Application Priority Data
Feb. 14, 2019 (JP) ................................ 2019-024802

(51) Int. Cl.
*H04J 3/06* (2006.01)
(52) U.S. Cl.
CPC .......... *H04J 3/0682* (2013.01); *H04J 3/0667* (2013.01); *H04J 3/0673* (2013.01)

(58) Field of Classification Search
CPC .... H04B 7/2678; H04J 3/0635; H04J 3/0667; H04J 3/0673; H04J 3/0682
See application file for complete search history.

(56) References Cited

U.S. PATENT DOCUMENTS 9,166,681 B2 * 10/2015 Cavaliere ............ H04J 14/0267
9,264,132 B2 * 2/2016 Zampetti ............... H04J 3/0644
(Continued)

FOREIGN PATENT DOCUMENTS

| JP | 2014216669 | 11/2014 |
|----|------------|---------|
| JP | 2015065525 | 4/2015 |

OTHER PUBLICATIONS

[No Author Listed], "IEEE Standard for a Precision Clock Synchronization Protocol for Networked Measurement and Control Systems," IEEE Std 1588-2008, Jul. 24, 2008, 290 pages.

*Primary Examiner* — Alpus Hsu
(74) *Attorney, Agent, or Firm* — Fish & Richardson P.C.

(57) ABSTRACT

A time synchronization mechanism is provided. A second transmission device includes: a transmission section configured to transmit packets for delay calculation for a plurality of wavelengths to the corresponding time transmission device simultaneously; and a reception section configured to calculate a propagation delay Dms on a path from the corresponding time transmission device to the second transmission device based on a difference between the arrival times of the packets for delay calculation for the plurality of wavelengths received, receive a propagation delay Dsm on a path from the second transmission device to the corresponding time transmission device calculated, and calculate a propagation delay Dmax that is larger than any of the propagation delay Dms and the propagation delay Dsm. The reception section transmits a received PTP packet to a slave (Continued)

node after a waiting delay Wms calculated by subtracting the propagation delay Dms from the propagation delay Dmax.

3 Claims, 15 Drawing Sheets

(56) References Cited

U.S. PATENT DOCUMENTS

| | | | |
|---|---|---|---|
| 9,584,217 B2 * | 2/2017 | Bottari | H04J 3/0697 |
| 9,628,210 B1 * | 4/2017 | Zampetti | H04J 3/0667 |
| 9,705,770 B2 * | 7/2017 | Cavaliere | H04J 14/0267 |
| 9,882,705 B2 * | 1/2018 | Osagawa | H04L 43/0852 |
| 10,075,258 B2 * | 9/2018 | Dutti | H04L 45/12 |
| 10,320,507 B2 * | 6/2019 | Heine | H04L 43/0852 |
| 2015/0085852 A1 | 3/2015 | Mizutani et al. | |
| 2015/0104167 A1 | 4/2015 | Bottari et al. | |

* cited by examiner

PRIOR ART

TRANSMISSION DEVICE, TIME TRANSMISSION SYSTEM, AND DELAY COMPENSATION METHOD

CROSS-REFERENCE TO RELATED APPLICATIONS

This application is a National Stage application under 35 U.S.C. § 371 of International Application No. PCT/JP2020/004618, having an International Filing Date of Feb. 6, 2020, which claims priority to Japanese Application Serial No. 2019-024802, filed on Feb. 14, 2019. The disclosure of the prior application is considered part of the disclosure of this application, and is incorporated in its entirety into this application.

TECHNICAL FIELD

The present invention relates to a transmission device, a time transmission system and a delay correction method.

BACKGROUND ART

Time synchronization technologies are needed for coordination among mobile base stations, for example, in the next generation (the fifth generation (5G)) mobile communication. For example, a time synchronization system is realized by distributing time reference devices, Grand Masters (GMs), at multiple sites. A GM at each site functions as a Global Navigation Satellite System (GNSS) receiver that can receive signals directly from GNSS satellites, and delivers the received signals directly to end applications.

An increase in the number of high-performance GNSS receivers, however, leads to higher costs. In addition, when those GMs cannot receive signals from satellites because of bad weather, the time accuracy decreases.

Thus, for example, Precision Time Protocol (PTP), in which time synchronization is performed using the timestamps of packets, is used to deliver information from GMs over packet networks (i.e., GNSS signals are indirectly received) (see Non-Patent Literature 1). In PTP, time synchronization is performed through highly reliable networks provided by telecommunications carriers.

This enables a decrease in the number of GNSS antennas and the receiving sites thereof and an improvement in reliability of GNSS reception by providing the decreased number of GNSS receivers (GMs) with a monitoring function. Duplication of paths in packet networks can also increase reliability of GNSS reception. Moreover, a GM can multiplex a PTP packet with a primary signal, thereby transmitting time information in an economical and accurate manner.

FIG. 17 is a block diagram illustrating a time transmission system to which a time synchronization technique is applied.

The time transmission system includes a GM node 82z, which is a PTP node compatible with PTP, Boundary Clock (BC) nodes 83z and 84z, an Ordinary Clock (OC) node 85z, all of which are connected by a network.

In the following, when time synchronization is performed between the PTP nodes, the PTP node that transmits time information is referred to as a master node 91z (see FIG. 18) and the PTP node that is being synchronized and receives the time information from the master node 91z is referred to as a slave node 92z (see FIG. 18). The flow of transmission of the time information is illustrated by the bold arrows in FIG. 17. The origin of each arrow is on the uplink side and the tip of the arrow is on the downlink side. That is, accurate time information is transmitted from the uplink side to the downlink side on the following path: the GM node 82z→the BC node 83z→the BC node 84z→the OC node 85z.

The GM node 82z includes an antenna 82a for receiving signals directly from a GPS satellite 81z.

The BC node 83z functions as a slave node 92z that receives time information from its master node 91z, i.e., the GM node 82z, and then as a master node 91z for the BC node 84z and transmits the time information to the BC node 84z.

The BC node 84z functions as a slave node 92z that receives time information from the BC node 83z, and then as a master node 91z for the OC node 85z and transmits the time information to the OC node 85z.

The OC node 85z functions as a slave node 92z that receives time information from the BC node 84z, and then transmits the time information to an end terminal 86z.

The reason why the BC nodes 83z, 84z and the OC node 85z are called differently is that the BC nodes 83z and 84z have multiple connection ports to other PTP nodes and the OC node 85z has only one connection port.

FIG. 18 is a sequence diagram illustrating how PTP works.

PTP packets with time information (timestamps) are exchanged between a master node 91z and a slave node 92z. As PTP packets, a downlink Sync message (S11z), a downlink Follow-up message (S12z), an uplink Delay_Request message (S13z) and a downlink Delay_Response message (S14z) are exchanged in this order.

The transmit time t1 is the time at which the master node 91z transmits the Sync message (S11z). Because it is difficult to include the transmit time t1 of the Sync message in the Sync message itself, the subsequent Follow-up message notifies the slave node 92z of the transmit time t1 of the Sync message.

The receive time t2 is the time at which the Sync message arrives at the slave node 92z.

The transmit time t3 is the time at which the slave node 92z transmits the Delay_Request message.

The receive time t4 is the time at which the Delay_Request message arrives at the master node 91z. The receive time t4 is indicated to the slave node 92z by including the receive time t4 in the Delay_Response message in response to the Delay_Request message.

In this way, the slave node 92z knows all the four timestamps (the transmit times t1 and t2 and the receive times t3 and t4).

In transmitting and receiving PTP packets, the following propagation delays may occur:

A downlink delay Dms: a propagation delay of the Sync message in the downlink direction from the master node 91z to the slave node 92z. The Dms can be calculated by using the time difference between the clock of the master node 91z and the clock of the slave node 92z as an offset value as follows: the downlink delay Dms=(the receive time t2−the offset value)−the transmit time t1.

An uplink delay Dsm: a propagation delay of the Delay_Request message in the uplink direction from the slave node 92z to the master node 91z. The uplink delay Dsm can be calculated as follows: the uplink delay Dsm=the receive time t4−(the transmit time t3−the offset value).

Assuming that the downlink delay Dms=the uplink delay Dsm, the slave node 92z can calculate the offset value by the following expression 1:

The offset value=((the receive time $t2$-the transmit time $t1$)-(the receive time $t4$-the transmit time $t3$))/2     (Expression 1)

The slave node 92z corrects its clock time using the calculated offset value so that the clock of the master node 91z and the clock of the slave node 92z are synchronized (set to indicate the same time).

CITATION LIST

Non-Patent Literature

Non-Patent Literature 1: IEEE (The Institute of Electrical and Electronics Engineers, Inc.), "IEEE Standard for a Precision Clock Synchronization Protocol for Networked Measurement and Control Systems", IEEE Std 1588-2008, Revision of IEEE Std 1588-2002, Jul. 24, 2008

SUMMARY OF THE INVENTION

Technical Problem

PTP is a protocol designed on the assumption that the uplink delay is equal to the downlink delay on a transmission path of PTP packets. Accordingly, an error in time synchronization accuracy occurs if there is a link asymmetry (difference between the uplink delay and the downlink delay). The following shows some causes of link asymmetry.

(a) Delays in devices on a transmission path may vary, for example, due to buffering for packet processing or due to frame processing.

(b) Delays of transmission lines may vary, for example, due to the difference between the lengths of fiber-optic cables when duplex fiber-optic bidirectional communication is performed—an optical path length difference of 1 m results in a delay of 5 ns (5 ns/m)—, or due to changes in the transmission line caused by temperature changes. The time error between geographically distant sites becomes greater in proportion to the optical path length difference in in-station wiring.

In consideration of the above, the main object of the present invention is to provide a time synchronization mechanism that can reduce influences of link asymmetry between time synchronization devices.

Means for Solving the Problem

To solve the problem described above, a transmission device according to the present invention has the following features.

The present invention provides a transmission device for use in a time transmission system, the time transmission system synchronizing time of a second time synchronization device based on time information of transmission and reception of packets for time synchronization between a first time synchronization device and the second time synchronization device via a first transmission device connected to the first time synchronization device and a second transmission device corresponding to the first transmission device and connected to the second time synchronization device, the transmission device being operable as the first transmission device or the second transmission device, comprising:

a transmission section configured to transmit packets for delay calculation for a plurality of wavelengths to a corresponding transmission device simultaneously; and a reception section configured to calculate a first propagation delay on a path from the corresponding transmission device to the transmission device based on a difference between arrival times of the packets for delay calculation for the plurality of wavelengths received from the corresponding transmission device, receive a second propagation delay on a path from the transmission device to the corresponding transmission device calculated by the corresponding transmission device, and calculate a set delay that is larger than any of the first propagation delay and the second propagation delay, wherein the reception section is further configured to calculate a third propagation delay on the path from the corresponding transmission device to the transmission device based on a difference between arrival times of the packets for time synchronization for the plurality of wavelengths when the packets for time synchronization are received from the corresponding transmission device, and transmit the received packets for time synchronization to the time synchronization device to which the transmission device is connected after waiting for a waiting delay that is calculated by subtracting the third propagation delay from the set delay.

This makes it possible to provide a time synchronization mechanism that is not influenced by link asymmetry between time synchronization devices because a constant set delay is configured for time synchronization packets to absorb the link asymmetry between the time synchronization devices.

The present invention provides a time transmission system comprising the transmission device, the first time synchronization device and the second time synchronization device, wherein the second time synchronization device is configured to calculate an offset value that is a difference between a clock of the first time synchronization device and a clock of the second time synchronization device by using transmit times and receive times of the packets for time synchronization at the time synchronization devices.

This enables time synchronization with high accuracy based on the transmit times and the receive times of packets for time synchronization that are not influenced by link asymmetry between time synchronization devices.

Effects of the Invention

According to the present invention, a time synchronization mechanism can be provided for reducing influences of link asymmetry between time synchronization devices.

DESCRIPTION OF EMBODIMENTS

An embodiment of the present invention will be described below in detail with reference to the drawings.

Figure 1:
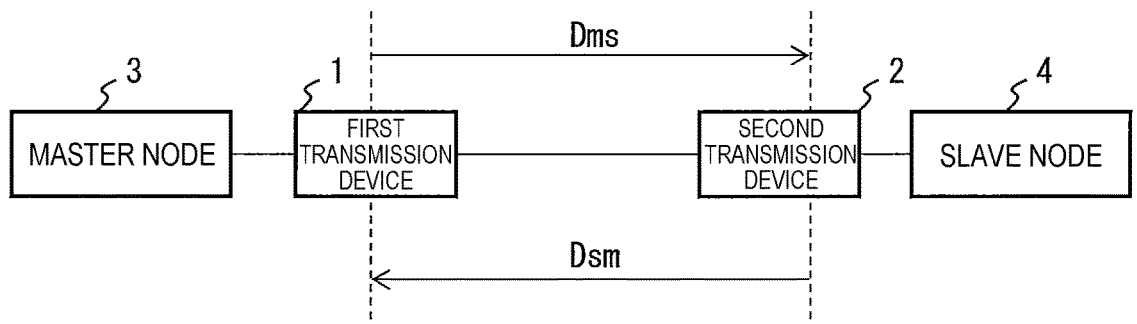
FIG. 1 is a block diagram illustrating a time transmission system to which a time synchronization technique is applied according to an embodiment of the invention.

FIG. 1 is a block diagram illustrating a time transmission system to which a time synchronization technique is applied.

In the time transmission system according to the embodiment, a time synchronization process for a slave node (second time synchronization device) 4 is performed by exchanging PTP packets (packets for time synchronization) between a master node (first time synchronization device) 3 and the slave node 4, which function as time synchronization devices.

As transmission devices that relay the PTP packets, a first transmission device 1 and a second transmission device 2 are provided with those transmission devices corresponding to each other. The master node 3 and the first transmission device 1 are directly connected and paired and the slave node 4 and the second transmission device 2 are directly connected and paired. Those transmission devices have a waiting function that reduces influences of link asymmetry between the master node 3 and the slave node 4 (see FIG. 3 for details) as well as the packet relay function.

The time transmission system transmits a downlink Sync message (S11z in FIG. 18) on the following path: the master node 3→the first transmission device 1→the second transmission device 2→the slave node 4, and transmits an uplink Delay_Request message (S13z in FIG. 18) on the inverse path.

A propagation delay occurring on the path from the first transmission device 1 to the second transmission device 2, which is the main component of a propagation delay on the path from the master node 3 to the slave node 4, is hereinafter referred to as a "Dms" (first propagation delay).

A propagation delay occurring on the path from the second transmission device 2 to the first transmission device 1, which is the main component of a propagation delay on the path from the slave node 4 to the master node 3, is hereinafter referred to as a "Dsm" (second propagation delay).

"ms" of the propagation delay Dms indicates the direction from master to slave and "sm" of the propagation delay Dsm indicates the direction from slave to master.

If |the propagation delay Dms−the propagation delay Dsm|>0, there is a link asymmetry between the time synchronization devices and the link asymmetry can be attributed to the sum of the delays in the devices (the first transmission device 1 and the second transmission device 2) on the transmission paths and the delays of the transmission lines. To reduce the link asymmetry, the propagation delay Dms on the path from the first transmission device 1 to the second transmission device 2 is measured instead of a delay on the path from the master node 3 to the slave node 4, and the propagation delay Dsm on the path from the second transmission device 2 to the first transmission device 1 is measured instead of a delay on the path from the slave node 4 to the master node 3.

The link asymmetry between the transmission devices can be nearly equal to the link asymmetry between the time synchronization devices by configuring the time transmission system as follows:

The lengths of the uplink wiring and the downlink wiring between the master node 3 and the first transmission device 1 are the same, and the lengths of the uplink wiring and the downlink wiring between the second transmission device 2 and the slave node 4 are the same.

A first synchronization module 10 is incorporated in the master node 3 and a second synchronization module 20 is incorporated in the slave node 4.

Figure 2:
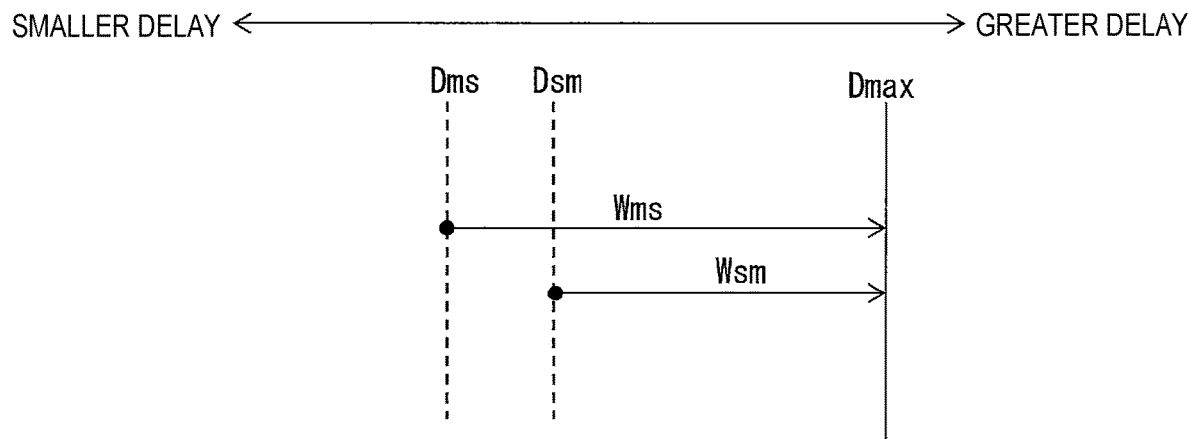
FIG. 2 is a schematic diagram illustrating a method for calculating delays in transmission devices according to the embodiment of the invention.

FIG. 2 is a schematic diagram illustrating a method for calculating delays in the transmission devices (the first transmission device 1 and the second transmission device 2).

(Step 1) A propagation delay Dms and a propagation delay Dsm are measured as delay amounts.

(Step 2) A propagation delay Dmax (set delay) is determined by adding some margin to the maximum of the delay amounts. That is, the propagation delay Dmax is larger than any of the propagation delay Dms and the propagation delay Dsm.

(Step 3) Each transmission device determines a waiting delay by subtracting from the propagation delay Dmax a propagation delay (third propagation delay) occurring during the transfer of a PTP packet from its source to the transmission device.

[The case of the second transmission device 2] For a downlink PTP packet, the waiting delay Wms=the propagation delay Dmax−the propagation delay Dms.

[The case of the first transmission device 1] For an uplink PTP packet, the waiting delay Wsm=the propagation delay Dmax−the propagation delay Dsm.

Figure 3:
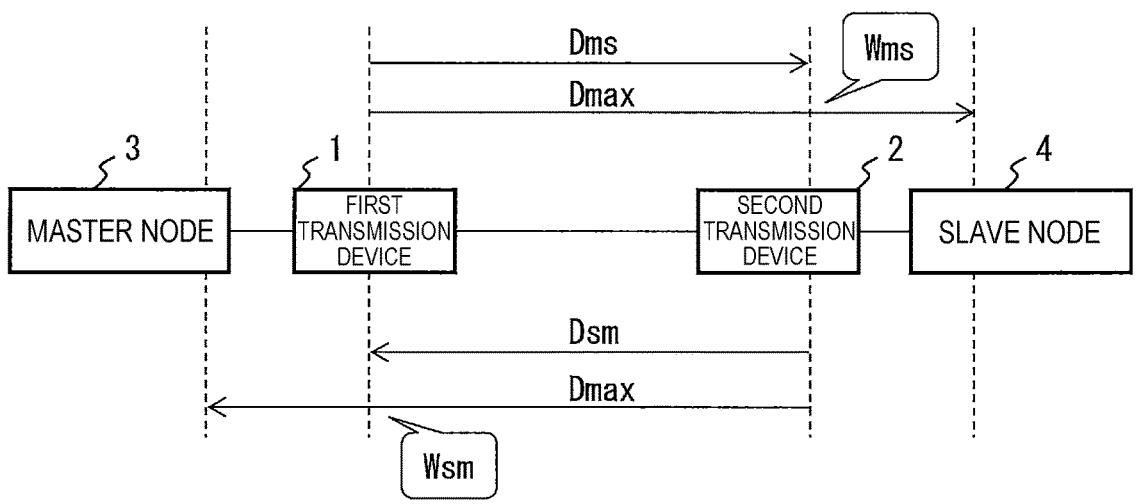
FIG. 3 is a block diagram of the time transmission system shown in FIG. 1 in a case where a link symmetry is ultimately established according to the embodiment of the invention.

FIG. 3 is a block diagram of the time transmission system shown in FIG. 1 in a case where a link symmetry is ultimately established.

As described with reference to FIG. 2, the second transmission device 2 receives a PTP packet with the propagation delay Dms and then waits for the waiting delay Wms before transmitting the received PTP packet, with the result that the total delay on the transmission line is equal to the propagation delay Dmax.

Similarly, as described with reference to FIG. 2, the first transmission device 1 receives a PTP packet with the propagation delay Dsm and then waits for the waiting delay Wsm before transmitting the received PTP packet, with the result that the total delay on the transmission line is equal to the propagation delay Dmax.

Accordingly, the uplink delay becomes equal to the downlink delay and a link symmetry is ultimately established. For example, even if PTP packets are transmitted on the same path in the same direction, the delays for the PTP packets are variable due to network congestion at the time of transmission of the PTP packets. This variation in delay can be removed by the transmission devices waiting until the total delay becomes equal to the propagation delay Dmax, whereby all the packets have the same delay.

Figure 4:
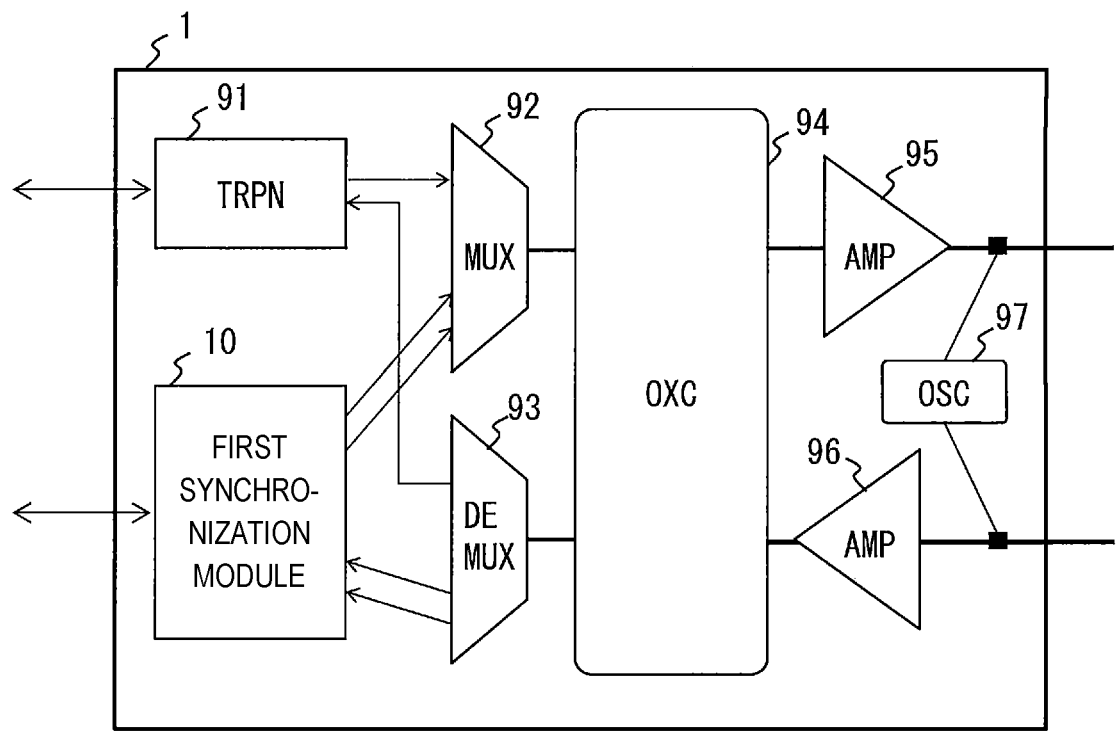
FIG. 4 is a block diagram illustrating a first transmission device according to the embodiment of the invention.

FIG. 4 is a block diagram illustrating the first transmission device 1. The first transmission device 1 is configured as a device to which the Wavelength Division Multiplexing (WDM) technology is applied for relaying optical signals. The first transmission device 1 includes, as its basic packet transmission units, a Transponder (TRPN) 91, a multiplexer (MUX) 92, a demultiplexer (DEMUX) 93, an Optical Cross Connect (OXC) 94, Amplifiers (AMP) 95 and 96 and an Optical Supervisory Channel (OSC) 97.

Usually, these basic packet transmission units do not need to be replaced once they are installed in the first transmission device 1. Replacement or enhancement is exceptionally required when the telecommunications demand surges or these packet transmission units fail.

The first transmission device 1 also includes a first synchronization module 10 as a processing unit that performs a time synchronization process using not only PTP packets but also proprietary packets for measuring propagation delays Dms and Dsm. The first synchronization module 10 is connected to a master node 3 and exchanges PTP packets with the master node 3. That is, the first synchronization module 10 can be added to the first transmission device 1 as an independent unit without changing the basic packet transmission units. This enables the function for establishing a link symmetry as shown in FIGS. 1 to 3 to be added at low cost.

The TRPN 91 is connected to a conventional router or transfer device other than the master node 3 and exchanges packets with the router or transfer device.

The optical signals transmitted by the first synchronization module 10 and the TRPN 91 are output to an optical network via the MUX 92, OXC 94, AMP 95 and OSC 97. The OSC 97 monitors the transmission lines and controls the device.

The optical signals received from the optical network are transferred to the first synchronization module 10 and the TRPN 91 via the OSC 97, AMP 96, OXC 94, MUX 92 and DEMUX 93.

Figure 5:
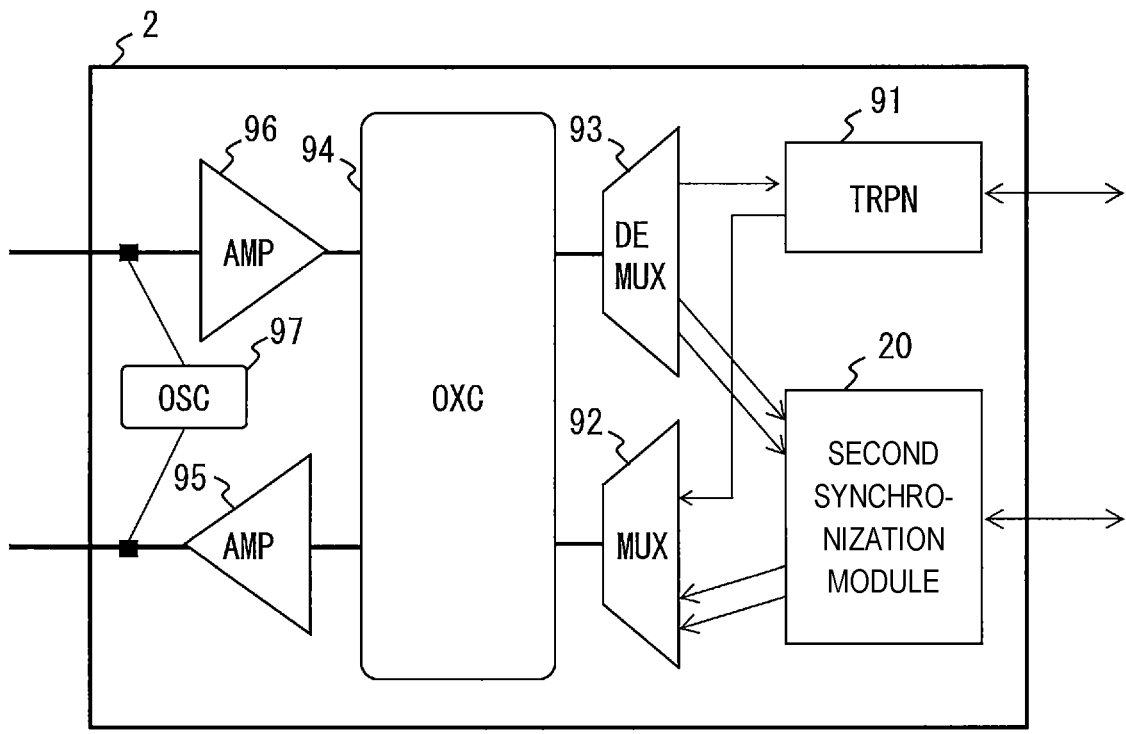
FIG. 5 is a block diagram illustrating a second transmission device according to the embodiment of the invention.

FIG. 5 is a block diagram illustrating the second transmission device 2. As in the first transmission device 1, the second transmission device 2 includes, as its basic packet transmission units, a TRPN 91, an MUX 92, a DEMUX 93, an OXC 94, AMPS 95 and 96 and an OSC 97. The functions of the basic packet transmission units of the second transmission device 2 are the same as those of the first transmission device 1 and therefore are not described again with reference to FIG. 5.

The second transmission device 2 includes a second synchronization module 20 as a processing unit that performs a time synchronization process using PTP packets and proprietary packets. The second synchronization module 20 is connected to a slave node 4 and exchanges PTP packets with the slave node 4.

Figure 6:
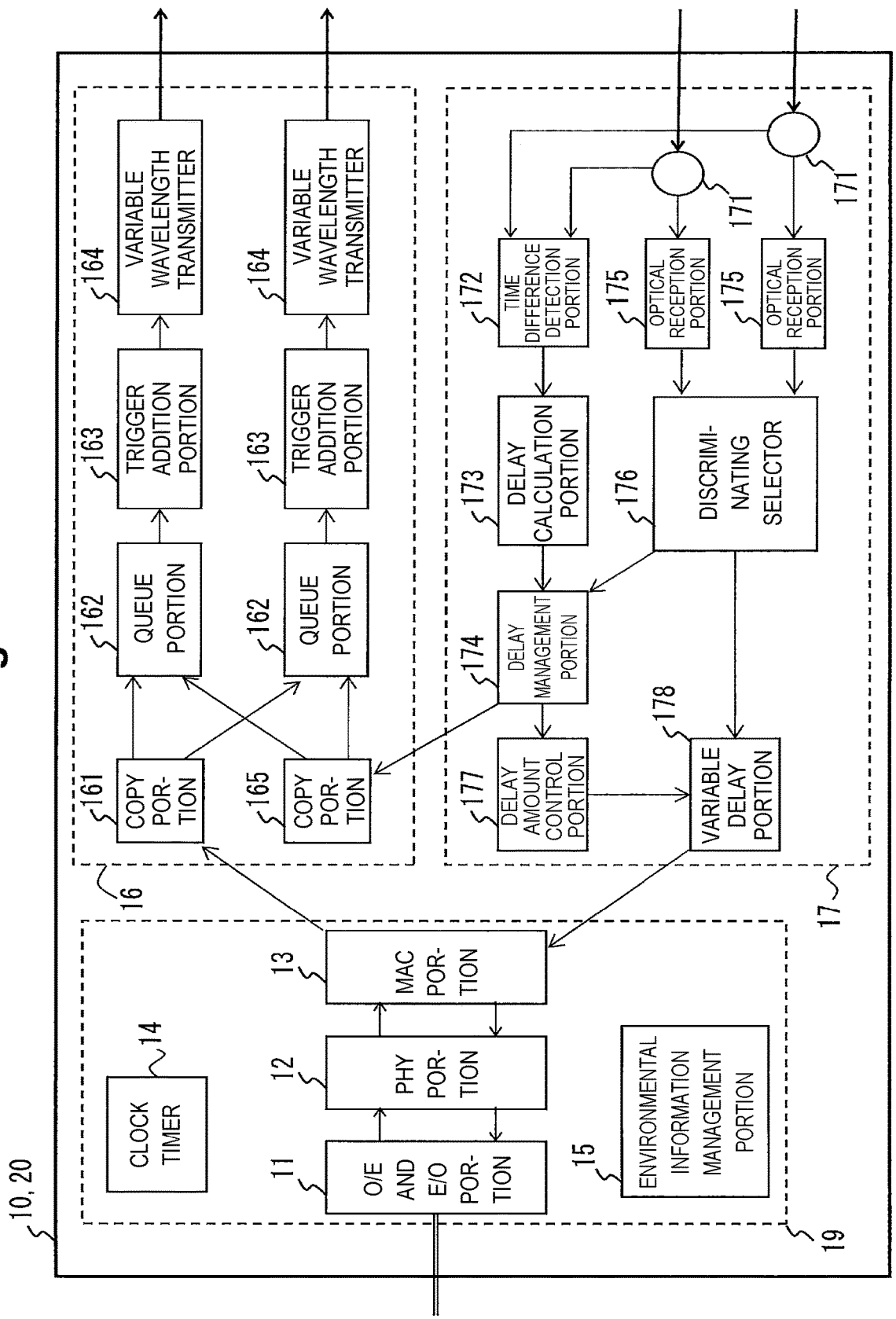
FIG. 6 is a block diagram illustrating a synchronization module according to the embodiment of the invention.

FIG. 6 is a block diagram illustrating the first synchronization module 10 or the second synchronization module 20. The configurations of both modules are the same.

A control section, which is one of the components of each module, may be a computer including a Central Processing Unit CPU, a memory, storage means (a storage portion) such as a hard disk, a non-volatile memory and a solid-state drive (SSD), and a network interface.

The computer of the control section operates the processing unit by the CPU executing programs (also referred to as applications or apps, an abbreviation for applications) loaded into the memory.

An O/E and E/O portion 11, variable wavelength transmitters 164, couplers 171 and optical reception portions 175 are respectively implemented in separate pieces of hardware. A PHY portion 12 and a MAC portion 13 are respectively implemented as Large Scale Integrations (LSIs).

Each of the first synchronization module 10 and the second synchronization module 20 includes a transmission section 16 that transmits PTP packets and proprietary packets, a reception section 17 that receives PTP packets and proprietary packets and a shared section 19. The shared section 19 includes the Optical-to-Electronic and Electronic-to-Optical signal converter (O/E and E/O) portion 11, the physical layer (PHY) portion 12, the Medium Access Control (MAC) portion 13, a clock timer 14 and an environmental information management portion 15.

The clock timer 14 provides a frequency or timing to ensure synchronized operations between any functional portions in the first synchronization module 10.

The environmental information management portion 15 manages information on wavelength dispersion coefficients and temperature.

The transmission section 16 includes queue portions 162, trigger addition portions 163 and the variable wavelength transmitter 164 respectively for two wavelengths, and also includes copy portions 161 and 165 that make copies of a packet and input the copies to both of those two transmission chains.

The copy portion 161 makes copies of a PTP packet for the two wavelengths.

The queue portions 162 store PTP packets and proprietary packets that are to be transmitted.

The trigger addition portion 163 add a trigger for arrival time difference detection performed by a time difference detection portion 172 to a PTP packet or a proprietary packet that is to be transmitted. The trigger may be implemented as a particular signal pattern (e.g., "101010 . . . 11") such as an Ethernet® preamble for recognizing the timing of a measurement target. The trigger may also be implemented as a particular value of a particular field in a packet.

One of the variable wavelength transmitters 164 converts a PTP packet or a proprietary packet into an optical signal having one of the two wavelengths and the other of the variable wavelength transmitters 164 converts the PTP packet or the proprietary packet into an optical signal having the other of the two wavelengths. Both of the variable wavelength transmitters 164 for the two wavelengths transmit the resultant optical signals simultaneously. While a case of using two wavelengths is taken as an example, three or more variable wavelength transmitters 164 may be used to transmit optical signals having three or more wavelengths simultaneously.

The copy portion 165 makes copies of a proprietary packet for the two wavelengths.

The reception section 17 includes the coupler 171, the time difference detection portion 172, a delay calculation portion 173, a delay management portion 174, optical reception portions 175, a discriminating selector 176, a delay amount control portion 177 and a variable delay portion 178.

The couplers 171 receive optical signals having two or more wavelengths transmitted by the variable wavelength transmitters 164 and output the received optical signals to the time difference detection portion 172 and the optical reception portions 175.

Figure 7:
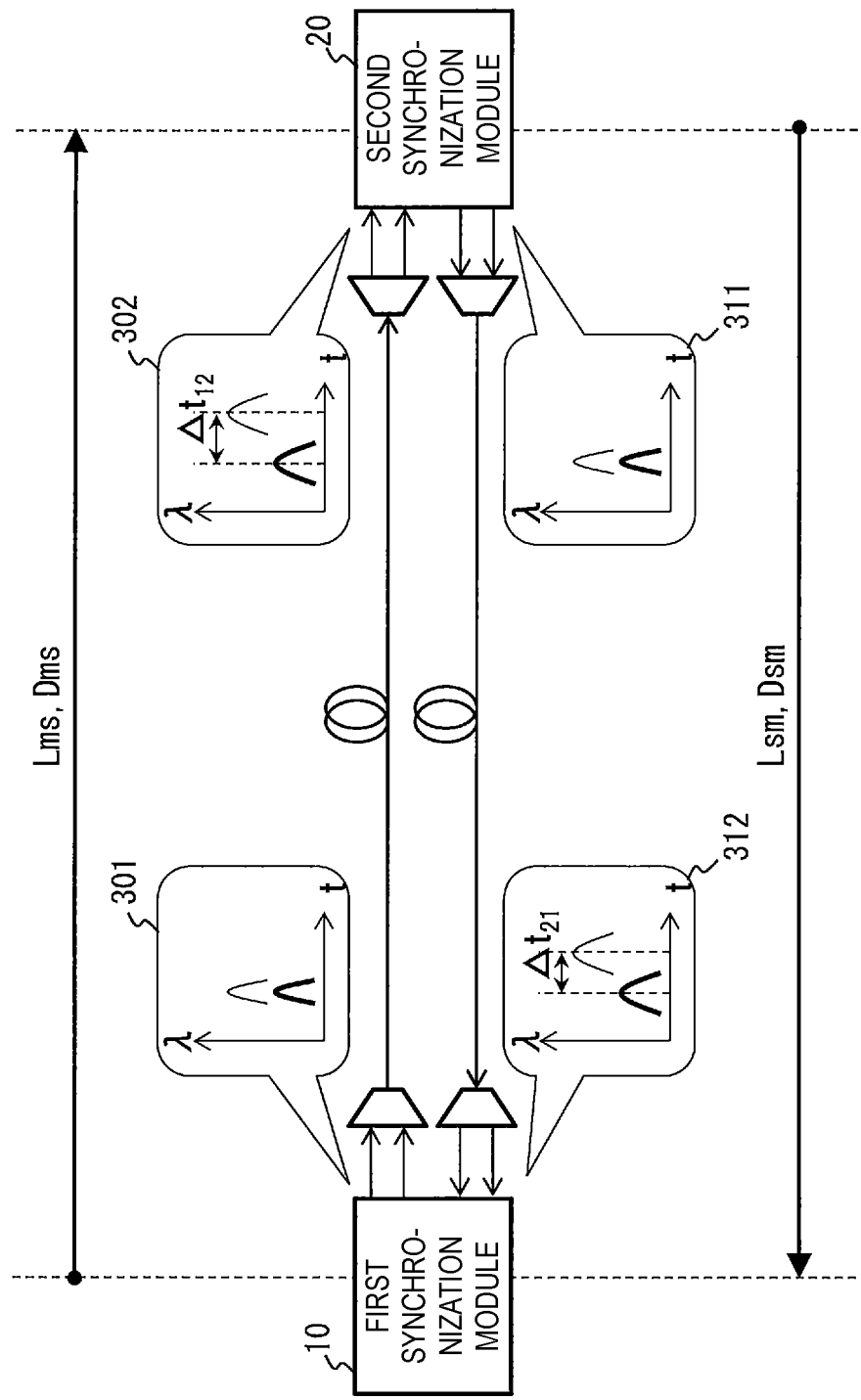
FIG. 7 is a schematic diagram illustrating a process of measuring propagation delays between the synchronization modules according to the embodiment of the invention.

The time difference detection portion 172 detects the arrival time difference $\Delta t$ between the optical signals having two or more wavelengths (see FIG. 7 for details). The time difference detection portion 172 may be implemented using functions of an oscilloscope.

The delay calculation portion 173 calculates a propagation delay Dms or Dsm from the arrival time difference $\Delta t$ (see FIG. 7 for details).

The delay management portion 174 transmits and receives the calculated propagation delays Dms and Dsm between the first synchronization module 10 and the second synchronization module 20, determines a waiting delay Wms or Wsm, and adjusts a delay in the transmission segment to be equal to a propagation delay Dmax (to be the same to establish a link symmetry), as shown in FIG. 2.

The optical reception portions 175 convert optical signals provided from the couplers 171 to electrical signals. When optical signals are converted, processing such as dispersion compensation may be performed.

The discriminating selector 176 selects and outputs one of the packets (electrical signals) for two wavelengths (e.g., the one that arrived earlier). As the output destinations, the discriminating selector 176 outputs PTP packets to the variable delay portion 178 and proprietary packets to the copy portion 165.

The delay amount control portion 177 provides the waiting delay Wms or Wsm determined by the delay management portion 174 to the variable delay portion 178.

The variable delay portion 178 waits for the provided waiting delay Wms or Wsm before transmitting PTP packets.

FIG. 7 is a schematic diagram illustrating a process of measuring propagation delays between the synchronization modules.

The length of downlink transmission line from the first synchronization module 10 to the second synchronization module 20 is Lms and the length of uplink transmission line from the second synchronization module 20 to the first synchronization module 10 is Lsm.

It is assumed that the wavelength dispersion coefficient C [ps/nm/km] of the optical fibers is known and Lms and Lsm are unknown. Although not shown in FIG. 7, pairs of optical fibers between the synchronization modules and the time synchronization devices (the master node 3 and the slave node 4) have the same length. Groups of optical fibers between the synchronization modules and the MUX 92/DEMUX 93 shown in FIGS. 4 and 5 also have the same length.

The variable wavelength transmitters 164 of the first synchronization module 10 input optical signals having two wavelengths (the wavelength difference: $\Delta\lambda$ [nm]) into a transmission line simultaneously (301). At 301, an optical signal represented by a bold line and an optical signal represented by a thin line have different wavelengths. In the transmission line that propagates the optical signals having the two wavelengths, the arrival timings of the optical signals at the second synchronization module 20 differ due to dispersion and the like.

The time difference detection portion 172 of the second synchronization module 20 detects the arrival time difference ($\Delta t12$ [ps]) between optical signals having two or more wavelengths (302).

The delay calculation portion 173 of the second synchronization module 20 calculates L12 using the following expression: $\Delta t12 = C \times \Delta\lambda \times L12$. Then, the delay calculation portion 173 calculates a propagation delay Dms using the expression: Dms=5000 [ns/km]×L12 [km] (×temperature correction).

The above describes details of the process of calculating the propagation delay Dms based on optical signals having two wavelengths transmitted from the first synchronization module 10 to the second synchronization module 20.

In the same manner, the first synchronization module 10 detects the arrival time difference ($\Delta t21$ [ps]) (312) between optical signals having two wavelengths transmitted simultaneously by the second synchronization module 20 in the inverse direction (311), and calculates a propagation delay Dsm.

Figure 8:
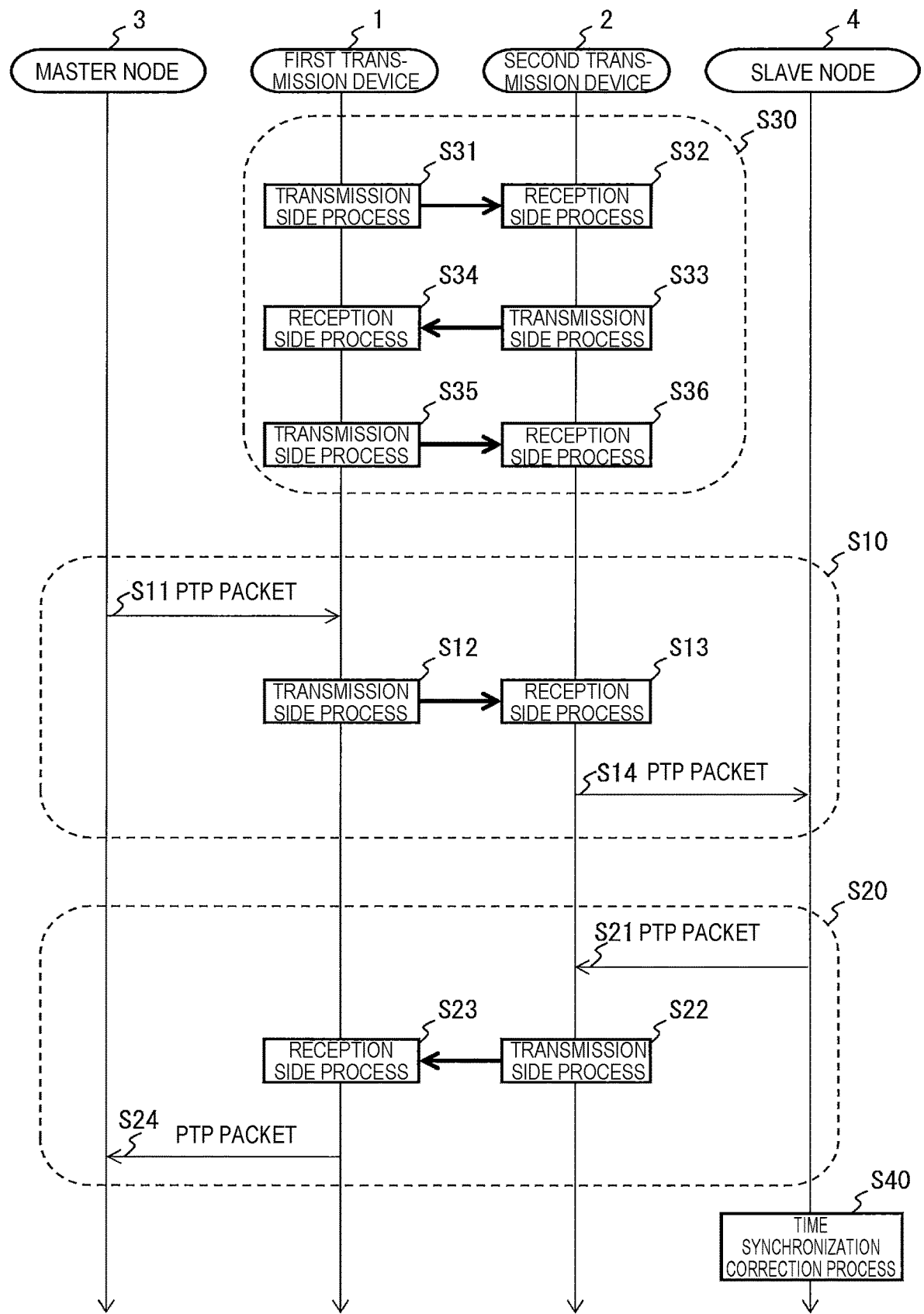
FIG. 8 is a sequence diagram illustrating an overall time synchronization process according to the embodiment of the invention.

FIG. 8 is a sequence diagram illustrating an overall time synchronization process. This sequence diagram can be divided into three process blocks.

(1) A preparation process for determining waiting delays Wms and Wsm (S30, including S31 to S36).
(2) A process for waiting for the waiting delay Wms so that the total delay becomes equal to a propagation delay Dmax and then transmitting a downlink PTP packet to the slave node 4 (S10, including S11 to S14).
(3) A process for waiting for the waiting delay Wsm so that the total delay becomes equal to the propagation delay Dmax and then transmitting an uplink PTP packet to the master node 3 (S20, including S21 to S24).

As described with reference to FIG. 2, the propagation delay Dmax is set to have a sufficient margin with respect to delay amounts such as actual measured propagation delays Dms and Dsm. Thus, the preparation process (S30) described in (1) is usually performed only once while the measured propagation delays Dms and Dsm change over time due to network congestion. It is preferable, however, to perform the preparation process (S30) again when the delays change significantly due to extensive replacement of network facilities including network expansion takes place.

First, the preparation process (S30) is described for collecting information on propagation delays Dms and Dsm.

In S31, the first transmission device 1 transmits proprietary packets used to calculate the propagation delay Dms to the second transmission device 2 by performing the transmission side process that is described below with reference to FIG. 9.

In S32, the second transmission device 2 calculates the propagation delay Dms by performing the reception side process that is described below with reference to FIG. 10.

In S33, the second transmission device 2 transmits proprietary packets used to calculate the propagation delay Dsm to the first transmission device 1 by performing the transmission side process that is described below with reference to FIG. 11.

In S34, the first transmission device 1 calculates the propagation delay Dsm by performing the reception side process that is described below with reference to FIG. 12.

The proprietary packets in S33 include the propagation delay Dms calculated in S32. In S34, the first synchronization module 10 can, therefore, obtain the propagation delay Dms in the received proprietary packets as well as calculate the propagation delay Dsm.

In S35, the first transmission device 1 calculates a propagation delay Dmax from the propagation delays Dms and Dsm by performing the transmission side process that is described below with reference to FIG. 13. Consequently, the first transmission device 1 can set the waiting delay Wsm in its variable delay portion 178. Then, the first transmission device 1 transmits proprietary packets including the calculated propagation delay Dmax to the second transmission device 2.

In S36, the second transmission device 2 can calculate a waiting delay Wms from the propagation delay Dmax in the received proprietary packets by performing the reception side process that is described below with reference to FIG. 14, and set the waiting delay Wms in its variable delay portion 178.

Second, the transfer process (S10) of a downlink PTP packet in (2) is described. The downlink PTP packet refers to a downlink Sync message (S11z in FIG. 18), the transmit time and the receive time of which are measured. The transfer process (S10) (to wait for the waiting delay Wms) may or may not be performed on a downlink Follow-up message (S12z) or a downlink Delay_Response message (S14z), the transmit time and the receive time of which are not measured (if the transfer process (S10) is not performed, the conventional PTP process is performed instead).

In S11, the master node 3 transmits a downlink PTP packet to the slave node 4 and the first transmission device 1 receives the PTP packet to relay the PTP packet.

In S12, the first transmission device 1 transfers the downlink PTP packet to the second transmission device 2 by performing the transmission side process that is described below with reference to FIG. 15.

In S13, the second transmission device 2 waits before transmitting the downlink PTP packet by performing the reception side process that is described below with reference to FIG. 16.

In S14, the second transmission device 2 transfers the downlink PTP packet to the slave node 4.

Lastly, the transfer process (S20) of an uplink PTP packet in (3) is described. The uplink PTP packet refers to an uplink Delay_Request message (S13z in FIG. 18), the transmit time and the receive time of which are measured.

In the transfer process (S20), a PTP packet is transmitted in the direction opposite to the direction in which a PTP packet is transmitted in the transfer process (S10), and the first transmission device 1 waits for the waiting delay Wsm in S23 while the second transmission device 2 waits for the waiting delay Wms in S13 in the transfer process (S10).

In S21, the slave node 4 transmits an uplink PTP packet to the master node 3 and the second transmission device 2 receives the PTP packet to relay the PTP packet.

Figure 15:
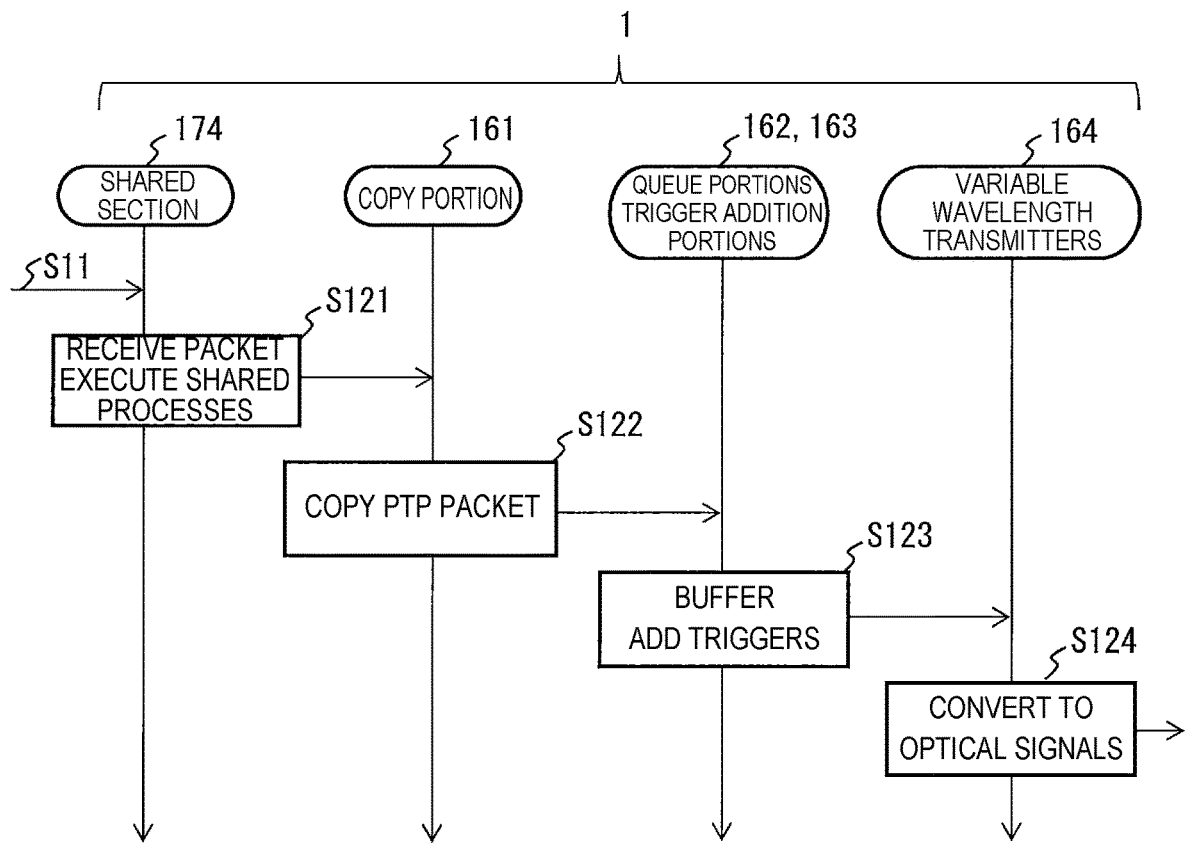
FIG. 15 is a sequence diagram illustrating details of a transmission side process S12 according to the embodiment of the invention.

In S22, the second transmission device 2 transfers the uplink PTP packet to the first transmission device 1 by performing a transmission side process similar to that shown in FIG. 15.

Figure 16:
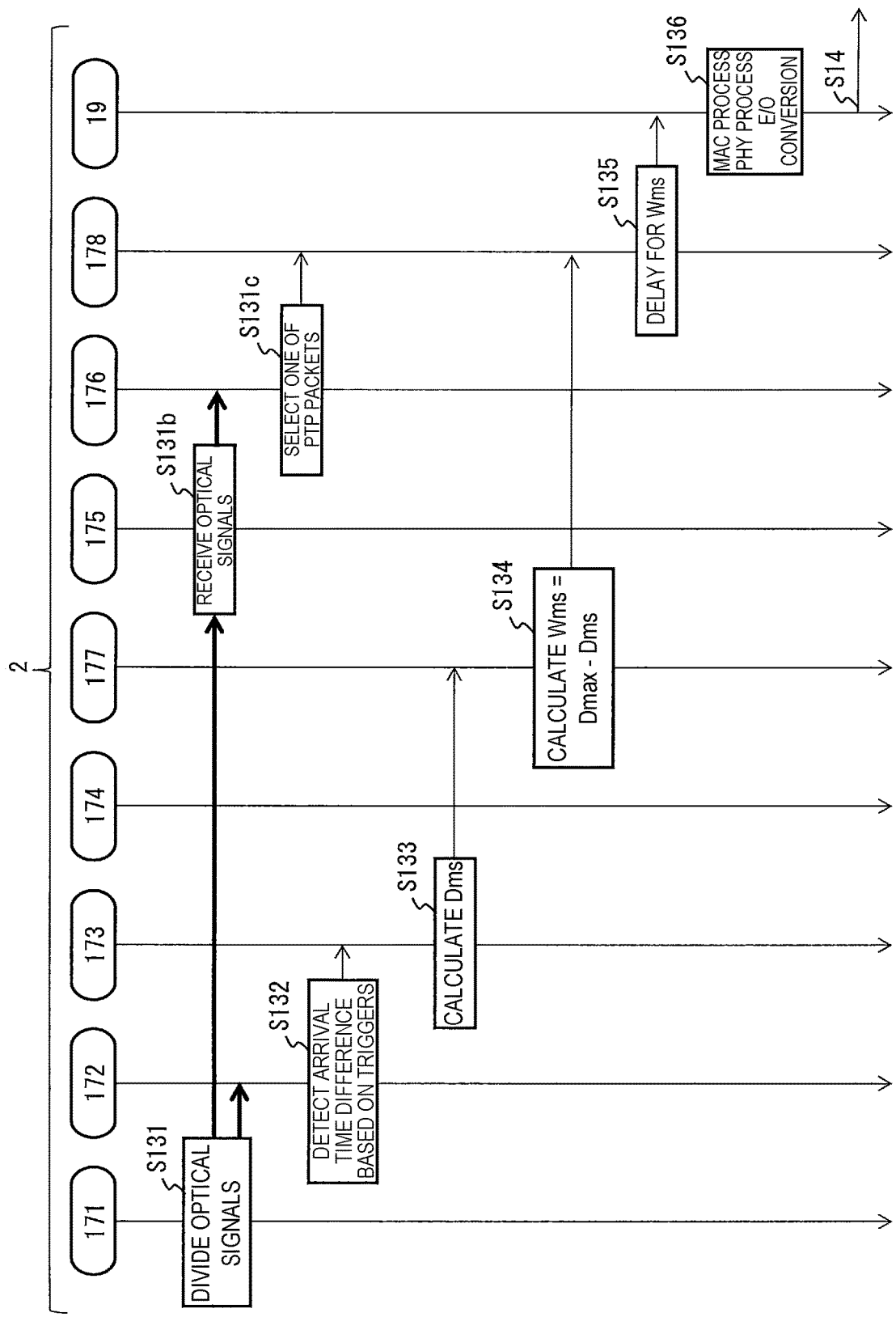
FIG. 16 is a sequence diagram illustrating details of a reception side process S13 according to the embodiment of the invention.
Figure 17:
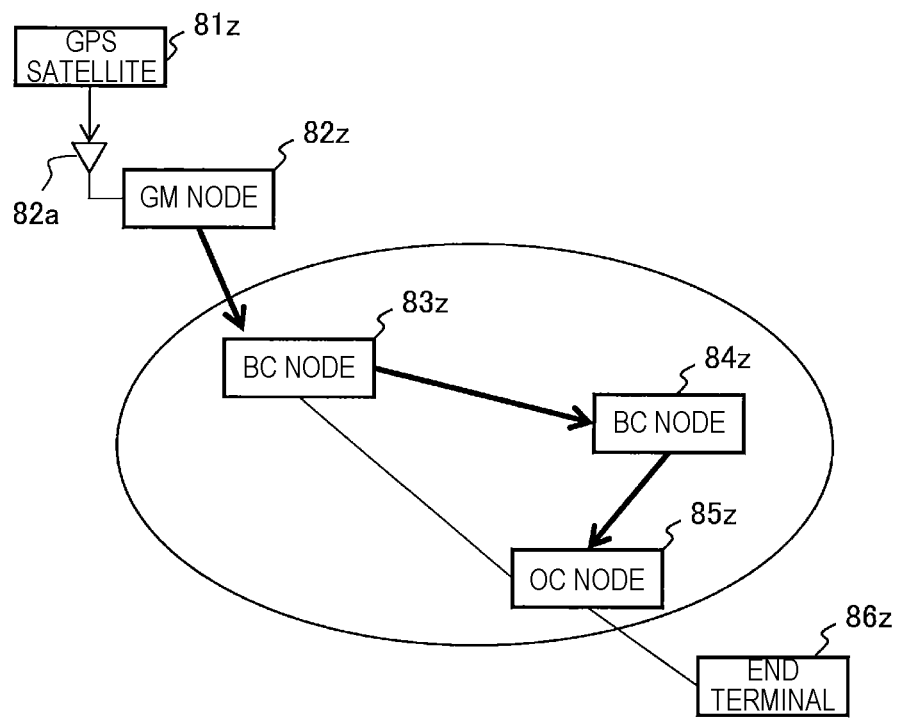
FIG. 17 is a block diagram illustrating a time transmission system to which a time synchronization technique is applied.

In S23, the first transmission device 1 waits before transmitting the uplink PTP packet by performing a reception side process similar to that shown in FIG. 16.

In S24, the first transmission device 1 transfers the uplink PTP packet to the master node 3.

Figure 18:
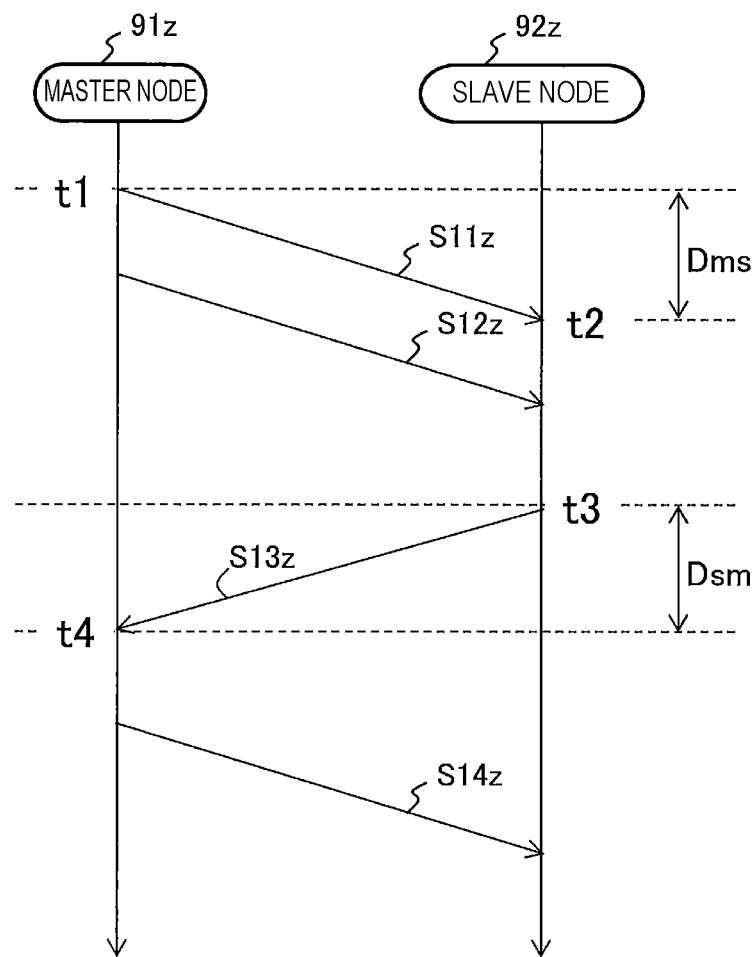
FIG. 18 is a sequence diagram illustrating how PTP works.

In S40, the slave node 4 performs a time synchronization correction process on its clock. In particular, as shown in FIG. 18, the slave node 4 calculates an offset value using the following expression 1:

The offset value=((the receive time $t2$-the transmit time $t1$)-(the receive time $t4$-the transmit time $t3$))/2  (Expression 1)

The overall time synchronization process is described above with reference to FIG. 8. In the following, the respective sub-processes of the overall process will be described in detail with reference to FIG. 9 to FIG. 16.

Figure 9:
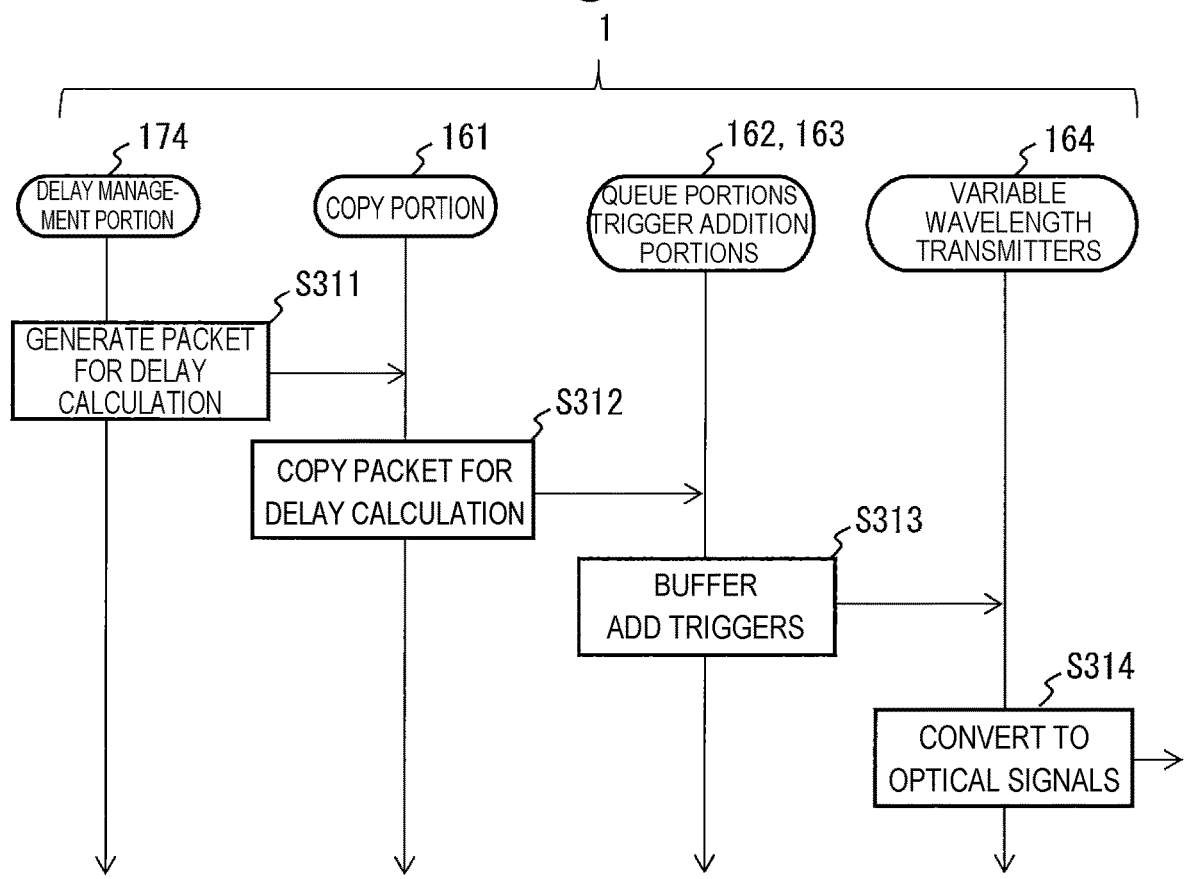
FIG. 9 is a sequence diagram illustrating details of a transmission side process S31 according to the embodiment of the invention.

FIG. 9 is a sequence diagram illustrating details of the transmission side process in S31. This sequence is executed by the first synchronization module 10 of the first transmission device 1.

In S311, the delay management portion 174 generates a new packet for delay calculation as a proprietary packet and outputs the packet to the copy portion 161.

In S312, the copy portion 161 copies the packet for delay calculation and outputs the copied packets to the queue portions 162 for two wavelengths.

In S313, the packets for delay calculation undergo buffering by the queue portions 162 and trigger addition by the trigger addition portions 163 and are then output to the variable wavelength transmitters 164.

In S314, the variable wavelength transmitters 164 convert the packets for delay calculation for two wavelengths to optical signals and output the optical signals to the second synchronization module 20 simultaneously.

Figure 10:
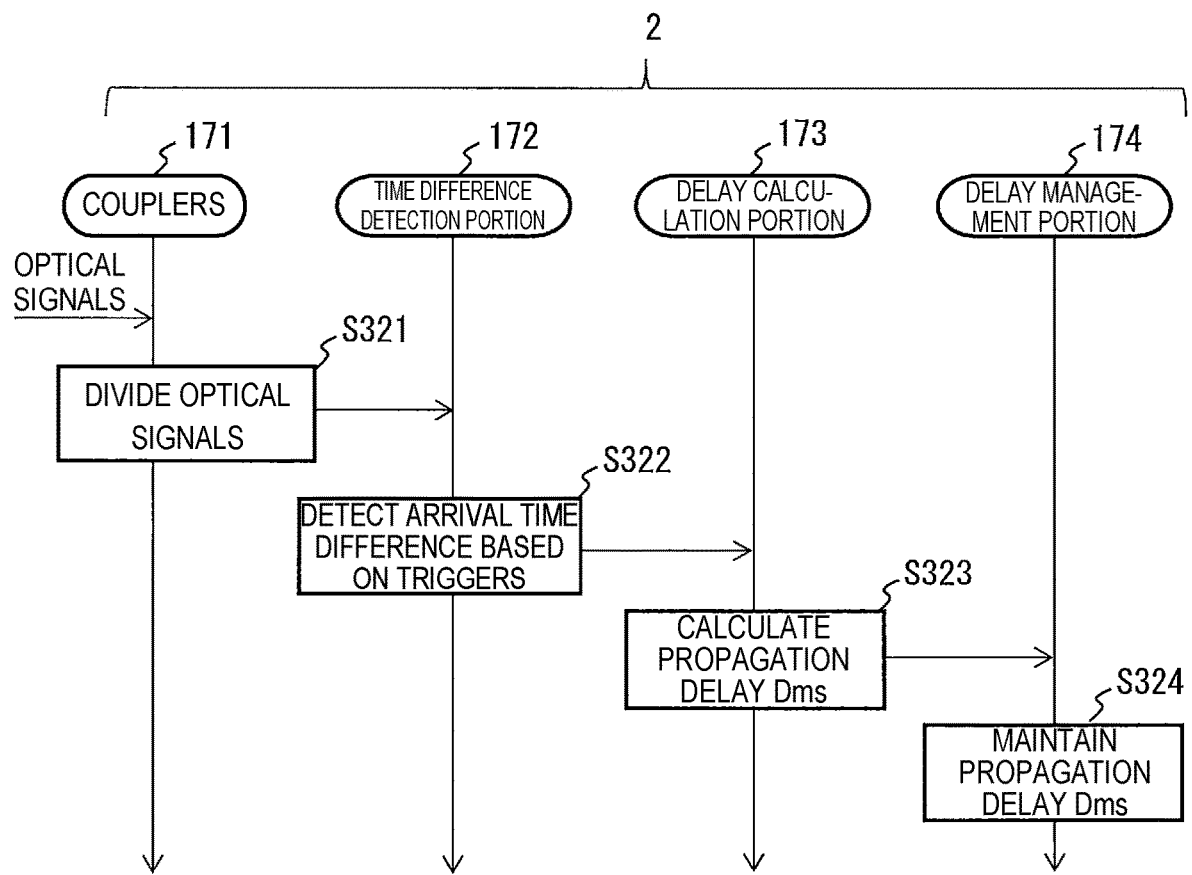
FIG. 10 is a sequence diagram illustrating details of a reception side process S32 according to the embodiment of the invention.

FIG. 10 is a sequence diagram illustrating details of the reception side process in S32. This sequence is executed by the second synchronization module 20 of the second transmission device 2.

In S321, the couplers 171 divide received optical signals for two wavelengths and output one of the divided optical signals to the time difference detection portion 172, respectively.

In S322, the time difference detection portion 172 detects the arrival time difference ($\Delta t12$) between the optical signals based on the triggers added by the trigger addition portions 163 and outputs the result to the delay calculation portion 173.

In S323, the delay calculation portion 173 calculates a propagation delay Dms from the arrival time difference between the optical signals as shown in FIG. 7 and outputs the result to the delay management portion 174.

In S324, the delay management portion 174 maintains the propagation delay Dms.

Figure 11:
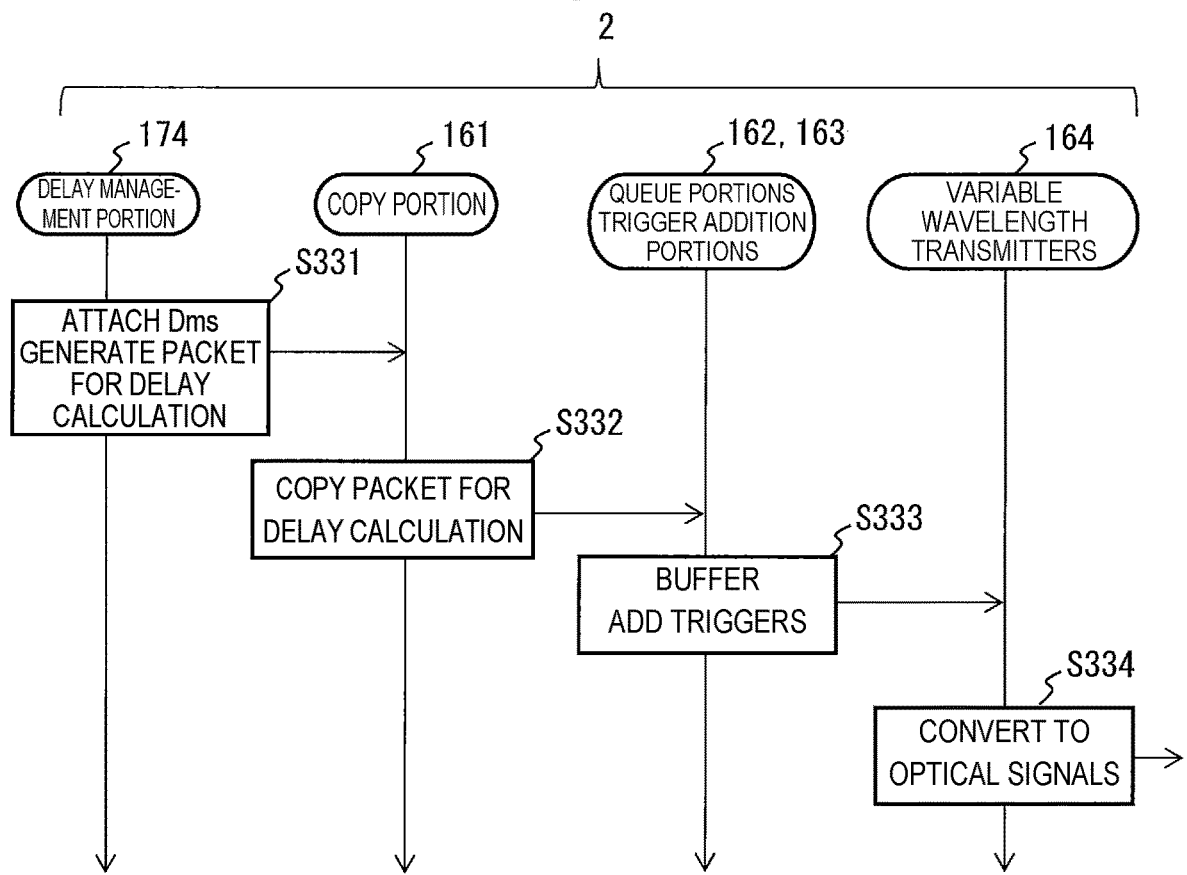
FIG. 11 is a sequence diagram illustrating details of a transmission side process S33 according to the embodiment of the invention.

FIG. 11 is a sequence diagram illustrating details of the transmission side process in S33. This sequence is executed by the second synchronization module 20 of the second transmission device 2.

In S331, the delay management portion 174 generates a new packet for delay calculation as a proprietary packet and outputs the packet to the copy portion 161. The packet for delay calculation includes the propagation delay Dms maintained in S324.

In S332, the copy portion 161 copies the packet for delay calculation and outputs the copied packets to the queue portions 162 for two wavelengths.

In S333, the packets for delay calculation undergo buffering by the queue portions 162 and trigger addition by the trigger addition portions 163 and are then output to the variable wavelength transmitters 164.

In S334, the variable wavelength transmitters 164 convert the packets for delay calculation for two wavelengths to optical signals and output the optical signals to the first synchronization module 10 simultaneously.

Figure 12:
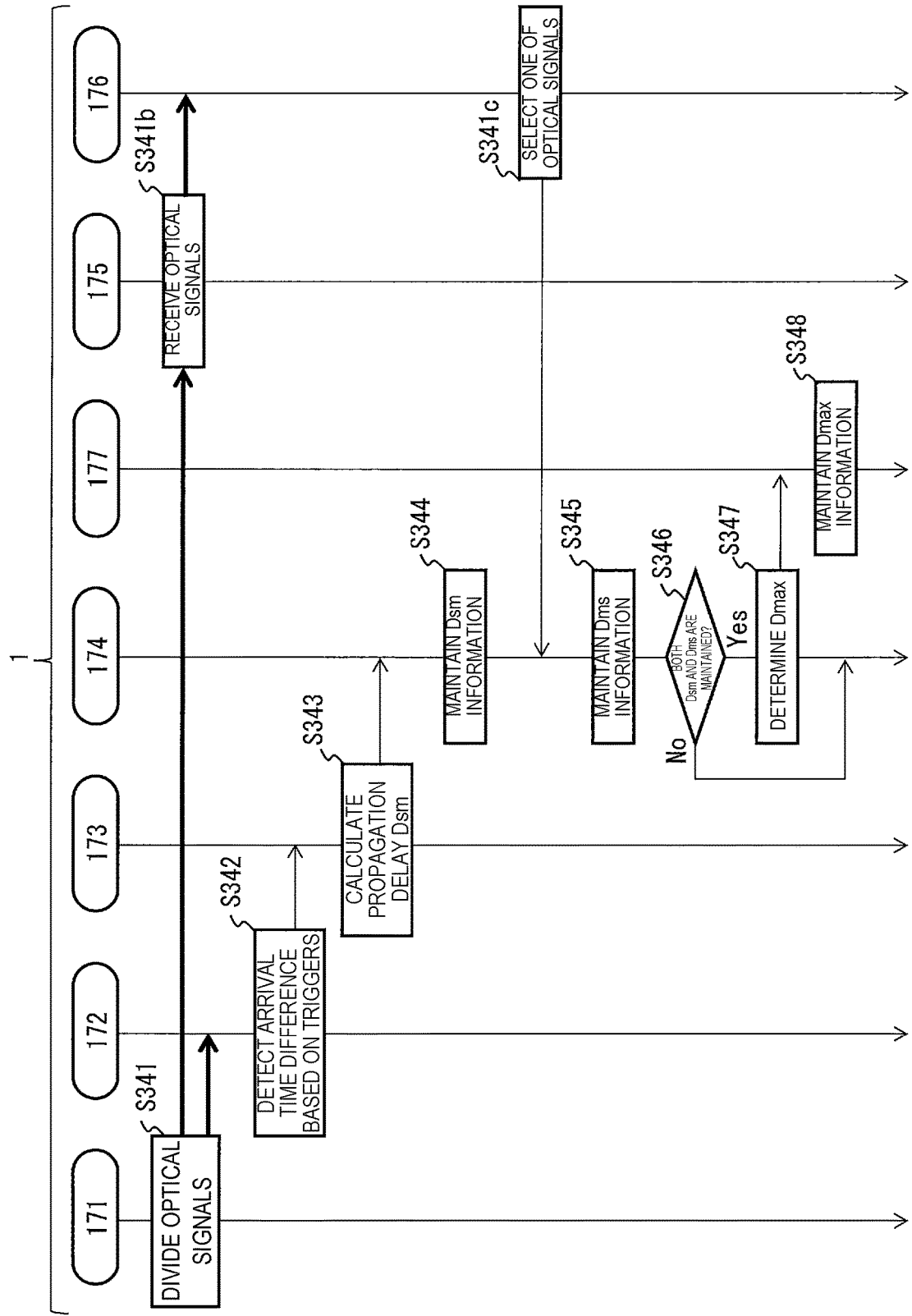
FIG. 12 is a sequence diagram illustrating details of a reception side process S34 according to the embodiment of the invention.

FIG. 12 is a sequence diagram illustrating details of the reception side process in S34. This sequence is executed by the first synchronization module 10 of the first transmission device 1.

In S341, the couplers 171 divide received optical signals for two wavelengths and output the divided optical signals to the time difference detection portion 172 and the optical reception portions 175.

In S341b, the optical reception portions 175 output the received optical signals to the discriminating selector 176.

In S341c, the discriminating selector 176 selects and outputs one of the optical signals for two wavelengths to the delay management portion 174.

In S342, the time difference detection portion 172 detects the arrival time difference ($\Delta t21$) between the optical signals based on the triggers added by the trigger addition portions 163 and outputs the result to the delay calculation portion 173.

In S343, the delay calculation portion 173 calculates a propagation delay Dsm from the arrival time difference between the optical signals as shown in FIG. 7 and outputs the result to the delay management portion 174.

In S344, the delay management portion 174 maintains information on the propagation delay Dsm calculated in S343.

In S345, the delay management portion 174 maintains information on the propagation delay Dms read from the proprietary packet provided in S341c.

In S346, the delay management portion 174 determines whether both propagation delays Dms and Dsm are maintained in the delay management portion 174. If both propagation delays Dms and Dsm are maintained in the delay management portion 174 (Yes), the process proceeds to S347; otherwise (No) the process ends.

In S347, the delay management portion 174 determines the propagation delay Dmax that is larger than the maximum of the propagation delays Dms and Dsm as shown in FIG. 2, and outputs the result to the delay amount control portion 177.

In S348, the delay amount control portion 177 maintains information on the propagation delay Dmax.

Figure 13:
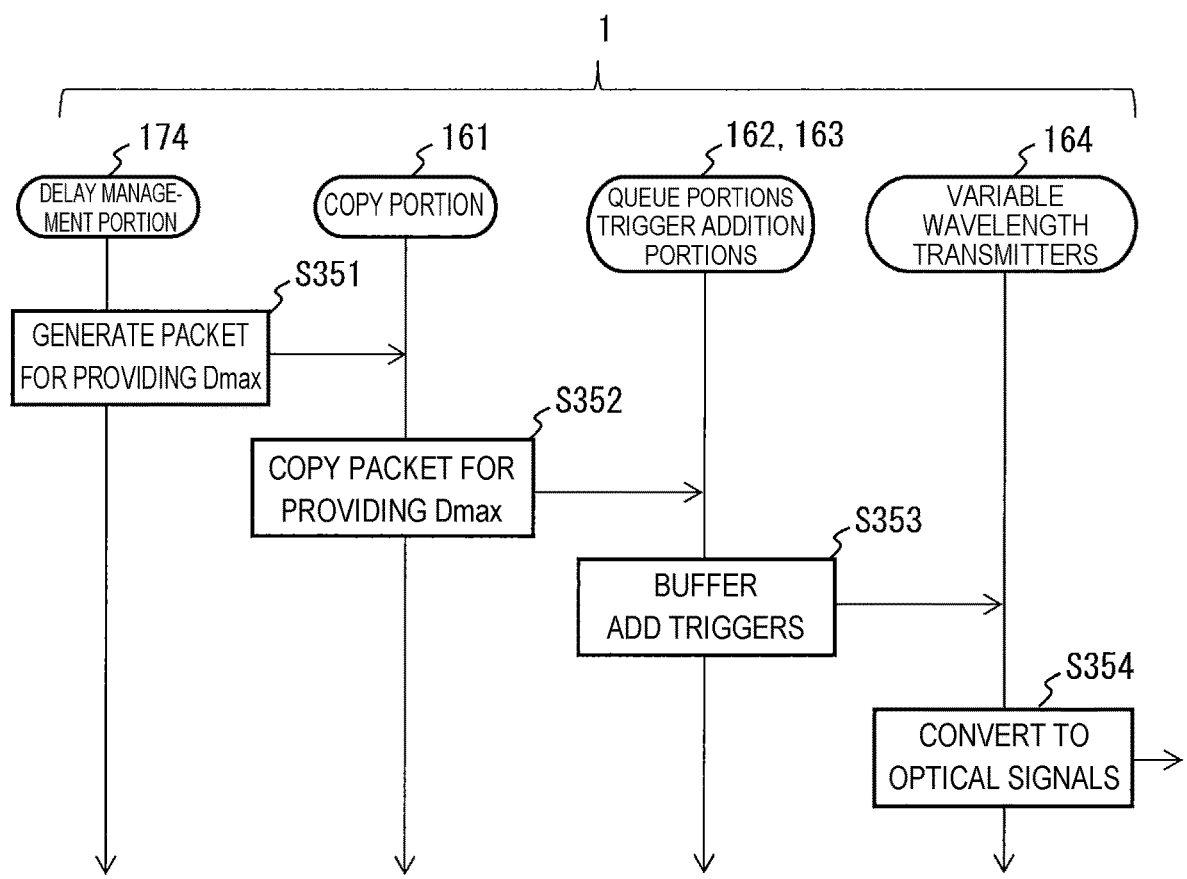
FIG. 13 is a sequence diagram illustrating details of a transmission side process S35 according to the embodiment of the invention.

FIG. 13 is a sequence diagram illustrating details of the transmission side process in S35. This sequence is executed by the first synchronization module 10 of the first transmission device 1.

In S351, the delay management portion 174 generates a new packet for providing the propagation delay Dmax as a proprietary packet and outputs the packet to the copy portion 161.

In S352, the copy portion 161 copies the packet for providing the propagation delay Dmax and outputs the copied packets to the queue portions 162 for two wavelengths.

In S353, the packets for providing the propagation delay Dmax undergo buffering by the queue portions 162 and trigger addition by the trigger addition portions 163 and are then output to the variable wavelength transmitters 164.

In S354, the variable wavelength transmitters 164 convert the packets for providing the propagation delay Dmax for two wavelengths to optical signals and output the optical signals to the second synchronization module 20 simultaneously.

Figure 14:
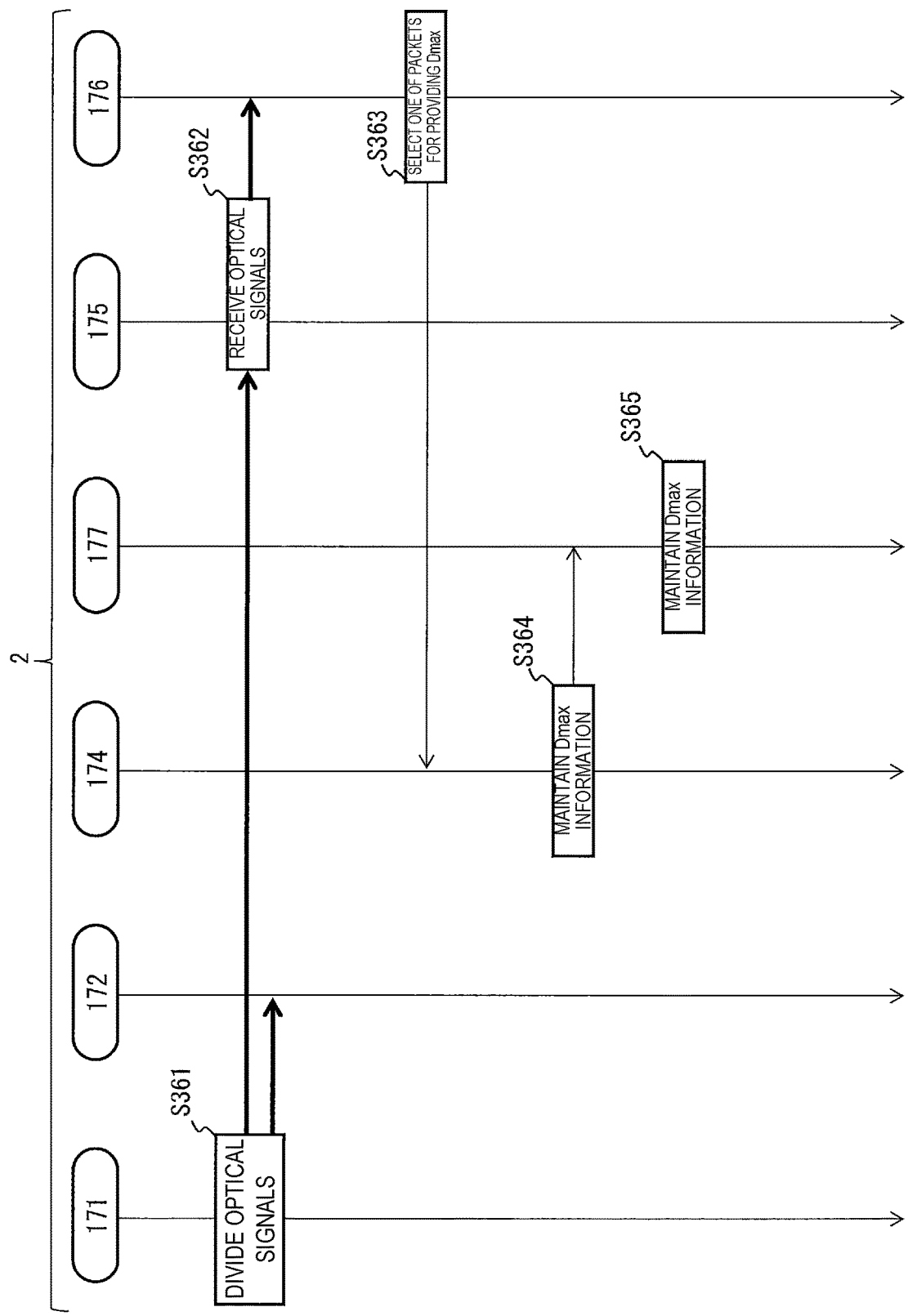
FIG. 14 is a sequence diagram illustrating details of a reception side process S36 according to the embodiment of the invention.

FIG. 14 is a sequence diagram illustrating details of the reception side process in S36. This sequence is executed by the second synchronization module 20 of the second transmission device 2.

In S361, the couplers 171 divide received optical signals for two wavelengths and output the divided optical signals to the time difference detection portion 172 and the optical reception portions 175. Because propagation delay measurement does not need to be performed on the packet for providing the propagation delay Dmax, the time difference detection portion 172 discards the output optical signal.

In S362, the optical reception portions 175 output the received optical signals to the discriminating selector 176.

In S363, the discriminating selector 176 selects and outputs one of the packets for providing the propagation delay Dmax from the optical signals for two wavelengths to the delay management portion 174.

In S364, the delay management portion 174 maintains information on the propagation delay Dmax read from the packet for providing the propagation delay Dmax and outputs the information to the delay amount control portion 177.

In S365, the delay amount control portion 177 maintains the information on the propagation delay Dmax.

FIG. 15 is a sequence diagram illustrating details of the transmission side process in S12. This sequence is executed by the first synchronization module 10 of the first transmission device 1.

In S121, the delay management portion 174 executes the processes of the shared section 19 (namely, the processes of the O/E and E/O portion 11, the PHY portion 12 and the MAC portion 13) that are to be performed when a PTP packet is received, and outputs the result to the copy portion 161.

In S122, the copy portion 161 copies the PTP packet and outputs the copied PTP packets to the queue portions 162 for two wavelengths.

In S123, the PTP packets undergo buffering by the queue portions 162 and trigger addition by the trigger addition portions 163 and are then output to the variable wavelength transmitters 164.

In S124, the variable wavelength transmitters 164 convert the PTP packets for two wavelengths to optical signals and output the optical signals to the second synchronization module 20 simultaneously.

FIG. 16 is a sequence diagram illustrating details of the reception side process in S13. This sequence is executed by the second synchronization module 20 of the second transmission device 2.

In S131, the couplers 171 divide received optical signals for two wavelengths and output the divided optical signals to the time difference detection portion 172 and the optical reception portions 175.

In S131b, the optical reception portions 175 output the received optical signals to the discriminating selector 176.

In S131c, the discriminating selector 176 selects and outputs to the variable delay portion 178 one of the PTP packets from the optical signals for two wavelengths, for which the second transmission device 2 waits for a waiting delay Wms.

In S132, the time difference detection portion 172 detects the arrival time difference ($\Delta t12$) between the optical signals based on the triggers added by the trigger addition portions 163 and outputs the result to the delay calculation portion 173.

In S133, the delay calculation portion 173 calculates a propagation delay Dms from the arrival time difference between the optical signals as shown in FIG. 7 and outputs the result to the delay amount control portion 177 via the delay management portion 174.

In S134, the delay management portion 174 calculates the waiting delay Wms=the propagation delay Dmax−the propagation delay Dms as shown in FIG. 2, and outputs the result to the variable delay portion 178.

In S135, the variable delay portion 178 waits for the waiting delay Wms before outputting the PTP packet provided in S131c to the shared section 19.

In S136, the shared section 19 executes the processes (namely, the processes of the MAC portion 13, the PHY portion 12 and the O/E and E/O portion 11) that are to be performed when a PTP packet is transmitted, and then executes the actual PTP packet transmission process in S14.

The foregoing time transmission system according to the present embodiment is primarily characterized by correcting (absorbing) delay asymmetry between the master node 3 and the slave node 4 by the transmission devices (the first transmission device 1 and the second transmission device 2) located at relay points.

In particular, both the total uplink delay and the total downlink delay are corrected to be equal to the same Dmax (to be symmetrical) by creating waiting delays Wms and Wsm arbitrarily at the transmission devices nearer the ends of the transmission paths of PTP packets. In order to calculate the propagation delay Dmax, proprietary packets for two wavelengths are exchanged between the first synchronization module 10 and the second synchronization module 20 provided in the transmission devices in advance, and propagation delays Dms and Dsm between the synchronization modules are calculated with high accuracy from the arrival time difference between the proprietary packets.

This can remove a cause of errors (delay asymmetry) in the time synchronization protocol PTP and enable highly accurate time synchronization between geographically distant sites.

Furthermore, the propagation delays Dms and Dsm including (a) delays in devices on transmission paths and (b) delays of transmission lines are measured with high accuracy, and the propagation delay Dmax is calculated from the result of the measurement and set in the first synchronization module 10 and the second synchronization module 20 (see FIG. 2). This can prevent a problem of PTP packets waiting too long due to the propagation delay Dmax being set too high and a problem of a delay asymmetry not being thoroughly removed due to the propagation delay Dmax being set too low.

Additionally, the programs that operate the control sections of the first synchronization module 10 and the second synchronization module 20 can be distributed through communication lines or recorded on and distributed via recording media such as CD-ROMs.

REFERENCE SIGNS LIST

1 First transmission device
2 Second transmission device
3 Master node (first time synchronization device)
4 Slave node (second time synchronization device)
10 First synchronization module
11 O/E and E/O portion
12 PHY portion
13 MAC portion
14 Clock timer
15 Environmental information management portion
16 Transmission section
17 Reception section
19 Shared section
20 Second synchronization module
161, 165 Copy portions
162 Queue portion
163 Trigger addition portion
164 Variable wavelength transmitter
171 Coupler
172 Time difference detection portion
173 Delay calculation portion
174 Delay management portion
175 Optical reception portion
176 Discriminating selector
177 Delay amount control portion
178 Variable delay portion

The invention claimed is:

1. A first transmission device for use in a time transmission system, wherein the time transmission system comprises (i) the first transmission device connected to a first time synchronization device and (ii) a second transmission device connected to a second time synchronization device, the first transmission device comprising:
  a transmission section configured to transmit packets for delay calculation for a plurality of wavelengths to the second transmission device simultaneously; and
  a reception section configured to:
    calculate a first propagation delay on a path from the second transmission device to the first transmission device based on a difference between arrival times of the packets for delay calculation for the plurality of wavelengths received from the second transmission device,
    receive a second propagation delay on a path from the first transmission device to the second transmission device calculated by the second transmission device, and
    calculate a maximum delay that is larger than any of the first propagation delay and the second propagation delay, wherein
  the reception section is further configured to:
    calculate a third propagation delay on the path from the second transmission device to the first transmission device based on a difference between arrival times of the packets for time synchronization for the plurality of wavelengths when the packets for time synchronization are received from the second transmission device, and
    transmit the received packets for time synchronization to the first time synchronization device after waiting for a a time interval that is calculated by subtracting the third propagation delay from the maximum delay.

2. A time transmission system comprising (i) a first transmission device connected to a first time synchronization device and (ii) a second transmission device connected to a second time synchronization device, wherein the first transmission device comprises:
  a transmission section configured to transmit packets for delay calculation for a plurality of wavelengths to the second transmission device simultaneously; and
  a reception section configured to:
    calculate a first propagation delay on a path from the second transmission device to the first transmission device based on a difference between arrival times of the packets for delay calculation for the plurality of wavelengths received from the second transmission device, receive a second propagation delay on a path from the first transmission device to the second transmission device calculated by the corresponding transmission device, and calculate a maximum delay that is larger than any of the first propagation delay and the second propagation delay, wherein the reception section is further configured to:

calculate a third propagation delay on the path from the second transmission device to the first transmission device based on a difference between arrival times of the packets for time synchronization for the plurality of wavelengths when the packets for time synchronization are received from the second transmission device, and transmit the received packets for time synchronization to the first time synchronization device after waiting for a time interval that is calculated by subtracting the third propagation delay from the set delay, and wherein the second time synchronization device is configured to calculate an offset value that is a difference between a clock of the first time synchronization device and a clock of the second time synchronization device by using transmit times and receive times of the packets for time synchronization at the first and the second time synchronization devices.

3. A delay correction method implemented by a time transmission system, wherein the time transmission system comprises (i) a first transmission device connected to a first time synchronization device and (ii) a second transmission device connected to a time synchronization device, each of the first transmission device comprising:

a transmission section configured to transmit packets for delay calculation for a plurality of wavelengths to the second transmission device simultaneously; and a reception section configured to:

calculate a first propagation delay on a path from the second transmission device to the first transmission device based on a difference between arrival times of the packets for delay calculation for the plurality of wavelengths received from the second transmission device, receive a second propagation delay on a path from the first transmission device to the second transmission device calculated by the second transmission device, and calculate a maximum delay that is larger than any of the first propagation delay and the second propagation delay, wherein the reception section is further configured to:

calculate a third propagation delay on the path from the second transmission device to the first transmission device based on a difference between arrival times of the packets for time synchronization for the plurality of wavelengths when the packets for time synchronization are received from the second transmission device, and transmit the received packets for time synchronization to the first time synchronization device after waiting for a time interval that is calculated by subtracting the third propagation delay from the set delay.

\* \* \* \* \*